Sept. 6, 1960
E. F. EGER
2,951,425
DEBURRING MACHINE
Filed Aug. 13, 1957
2 Sheets-Sheet 1
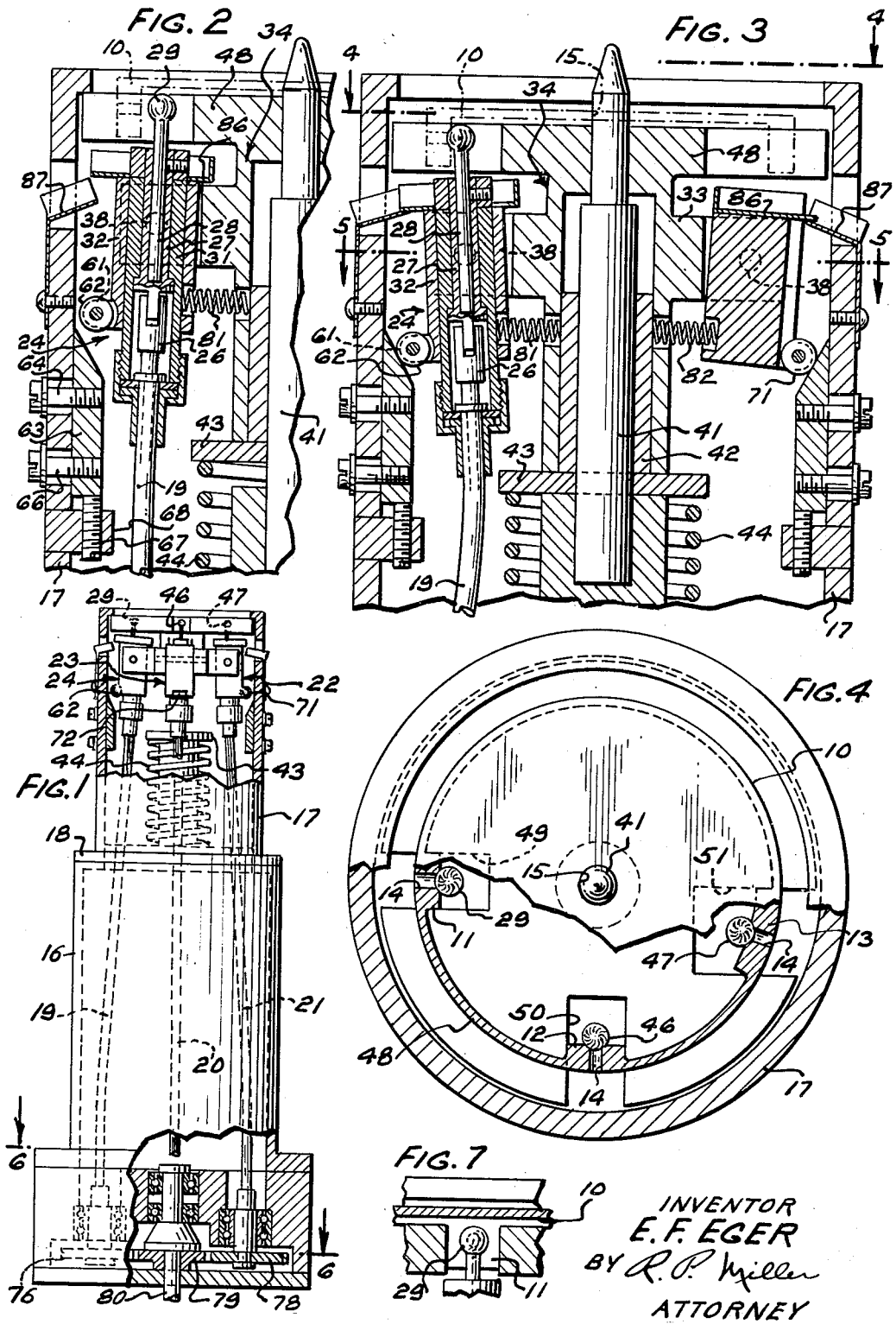
INVENTOR
E. F. EGER
BY R. P. Miller
ATTORNEY Sept. 6, 1960           E. F. EGER           2,951,425
DEBURRING MACHINE
Filed Aug. 13, 1957           2 Sheets-Sheet 2
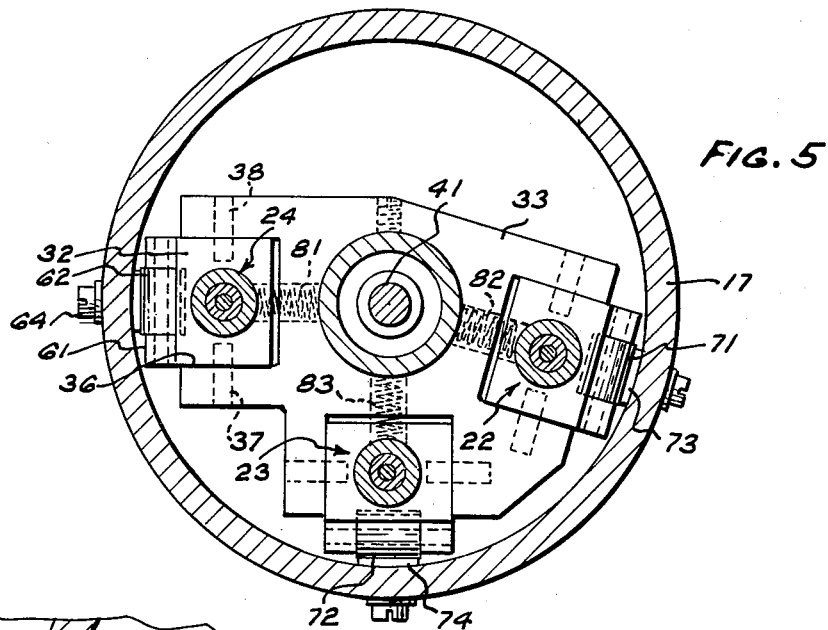
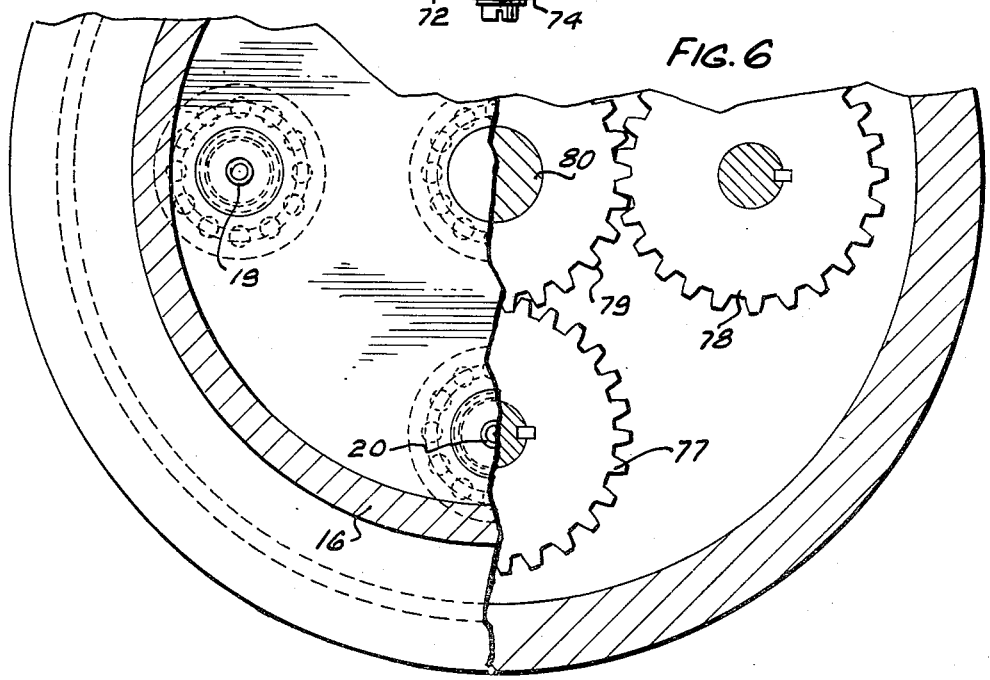
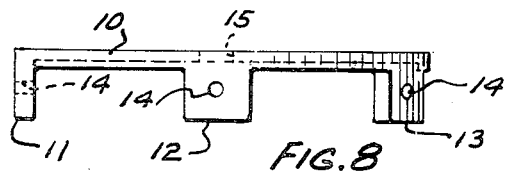
INVENTOR
E. F. EGER
BY R. P. Miller
ATTORNEY

United States Patent Office 2,951,425
Patented Sept. 6, 1960

2,951,425
DEBURRING MACHINE

Edward F. Eger, Indianapolis, Ind., assignor to Western Electric Company, Incorporated, New York, N.Y., a corporation of New York Filed Aug. 13, 1957, Ser. No. 677,975

7 Claims. (Cl. 90—15)

This invention relates to a deburring machine, and more particularly to a machine for simultaneously deburring a plurality of widely spaced areas of a work piece.

In the machining of various work pieces, burrs are often formed about apertures that are drilled, tapped or otherwise fabricated. At present the usual procedure is to file or slightly counterbore with a deburring tool, the apertures to remove the burrs, a very tedious, costly and time consuming procedure, particularly where high speed production is desired. This procedure becomes more of a problem in a situation where each work piece must be deburred at several locations that are not readily accessible.

A cardinal object of the present invention resides in a multi-headed deburring machine that may be utilized to deburr several diversely and normally inaccessibly located sections of a work piece.

A further object of the invention is the provision of a slidable carrier for the work piece that may be manually moved to bring the work piece into position while a plurality of tools are moved into position to deburr sections of the work piece.

It is a further object of the invention to provide a multi-headed deburring tool wherein facilities are provided to adjust the cutting depth or penetration of the deburring tools.

An additional object of the invention resides in a deburring machine having facilities wherein a work piece may be manually loaded on a carrier and moved into a position while a plurality of constantly rotating deburring tools are cammed into deburring positions at several diversely located areas of the work piece.

With these and other objects in view, the present invention contemplates a carrier for receiving a work piece having a number of diversely spaced areas that are desired to be deburred. Positioned in alignment but spaced from each area is a constantly rotating deburring tool assembly that is pivotally mounted on a carrier. Resilient means are provided to support the carrier within a frame so that when the work piece is loaded in the carrier the tools do not engage the work piece. When a manual depressing force is exerted on the work piece, the resilient support means permits the carrier to move the tool assemblies into engagement with camming means that function to pivot the tool assemblies whereupon the cutting edges of the deburring tools are moved into engagement with the areas on the work piece to be deburred.

Other objects and advantages of the present invention will be apparent from the following detailed description when considered in conjunction with the accompanying drawings, wherein Fig. 1 is a side elevational view partially cut away showing a multi-headed deburring machine incorporating the principles of the present invention;

Fig. 2 is an enlarged vertical sectional view of one of the deburring tools and supporting structure in an unoperated position;

Fig. 3 is a vertical sectional view of two of the carriers for the deburring tools together with supporting structure in a deburring position;

Fig. 4 is a top plan view partially cut away of the deburring machine shown in Fig. 1;

Fig. 5 is a sectional view taken along line 5—5 of Fig. 3 showing the details of construction of a carrier for a plurality of deburring tools;

Fig. 6 is an enlarged partial view of a section taken along line 6—6 of Fig. 1 showing the drive means for the deburring tools;

Fig. 7 is a fragmentary side view of a deburring tool in engagement with a work piece, and Fig. 8 is a side view of a work piece that may be deburred by the machine shown in the other views.

Referring first to Fig. 8, there is shown a work piece used to illustrate the invention that may be deburred by use of the machine shown in the other views. It is to be understood that the particular shape and size of the work piece is selected merely for purposes of illustration, and that the principles of the invention may be readily utilized to construct other deburring machines for deburring work pieces of different size and shape. In this instance, the work piece consists of a disc-section 10 having three depending lugs 11, 12 and 13, each of which has formed therein an aperature 14. Further, the disc-section has formed therein a relatively large centrally located aperture 15. When the apertures 14 are formed or tapped from the outside, burrs are usually formed on the inside that must be removed prior to incorporation of the work piece in an assembled piece of equipment.

Referring to Fig. 1, there is shown a lower housing 16 and an upper hollow cylindrical housing section 17 connected together by a plate 18. Passing through suitable apertures formed in the plate 18 are a series of three flexible drive shafts 19, 20 and 21. Each of the flexible shafts terminates in a connection to a deburring tool assembly respectively generally designated by the reference numerals 22, 23 and 24.

Referring to Fig. 2, there is shown the details of the deburring tool assembly 24 which comprises a slide coupling 26 serving to interconnect the flexible shaft 19 with a spindle shaft 27. Spindle shaft 27 is hollow and has secured therein a deburring tool 28 having a generally spherical cutting head 29. Shaft 27 is rotatably mounted within an inner bearing surface of a sleeve 31 that is secured within a suitable aperture formed in a pivot block 32.

Referring to Figs. 3 and 5, it will be noted that the entire deburring tool assembly 24 is pivotally mounted within a radially extending flange plate 33 of a carrier generally designated by the reference numeral 34. The carrier plate 33 is provided with a slot 36 into which project a pair of pivot pins 37 and 38 that fit within apertures formed in the sides of the block 32 to provide a pivotal mounting therefor. Each of the other deburring tool assemblies 22 and 23 is constructed in a similar fashion. From an inspection of Fig. 5, it will be noted that the deburring tool assemblies 22, 23 and 24 are not evenly spaced about the cylindrical housing section 17 but are generally positioned in alignment with the depending lugs 11, 12 and 13 of the work piece 10. The deburring tools of the assemblies 22, 23 and 24 are spaced so as to be able to move into engagement with the edges of the apertures 14 that are to be deburred.

The carrier 34 is slidably mounted on a pintle 41. The lower portion of the carrier 34 is secured to a sleeve 42 having a flanged section 43 that is engaged by a compression spring 44. The lower portion of compression spring 44 presses against the plate 18 separating sections 16 and 17 of the housing for the machine. It may be thus appreciated that the carrier together with all of the deburring tool assemblies mounted thereon is continuously urged in an upwardly position. The position of the carrier, when positioned by the spring 44, is clearly illustrated in Figs. 1 and 2, and the position of the carrier when the carrier is depressed is illustrated in Fig. 3.

The other deburring tool assemblies 22 and 23 have deburring tools 46 and 47 mounted therein. As shown in Fig. 4 when the deburring machine has been operated, the deburring tools 29, 46 and 47 are moved into engagement with the edges of the apertures 14 formed in the depending lugs 11, 12 and 13 of the work piece 10. Fig. 7 shows the deburring tool 29 in engagement with the aperture formed in the lug 11. The upper portion of the carrier 34 forms a plate 48 that is slotted at 49, 50 and 51 to accommodate the depending lugs 11, 12 and 13 when the work piece 10 is positioned over the pintle 41 so that the tapered upper extremity of pintle 41 passes through the aperture 15 formed in the top section of the work piece.

Each of the blocks in the deburring tool assemblies 22, 23 and 24 have an extending abutment such as an abutment 61 extending from block 32. Rotatably mounted on abutment 61 is a cam follower roller 62 adapted to engage a cam 63 secured by screws 64 and 66 and lock washers to the upper section of the housing 17. Suitable slots are formed in the walls of the housing to accommodate the screws 64 and 66 so that the cam 63 may be adjusted upwardly or downwardly with respect to position of cam follower roller 62. In order to fix the cam 63 in position, an adjusting screw 67 is provided to extend through a projecting portion 68 of the housing 17. Deburring assemblies 22 and 23 also have rollers mounted thereon similar to roller 62. In the drawings (see Figs. 1 and 5) these rollers are designated by the reference numerals 71 and 72. Rollers 71 and 72 cooperate with cams 73 and 74 that are substantially identical to the cam 63 and which are mounted by substantially identical structure.

Referring now to Figs. 1 and 6, the flexible shafts 19, 20 and 21 are connected to gears 76, 77 and 78 that are in turn driven by a constantly rotating gear 79. Suitable bearings are provided to support each of the shafts 19, 20 and 21. Drive power from an electric motor or other suitable source is imparted to a shaft 80 that in turn drives the gear 79, and as a result thereof, the gears 76, 77 and 78 and the flexible shafts 19, 20 and 21.

In use of the machine, a work piece 10 is placed on the upper surface of the carrier 34 so that the lugs 11, 12 and 13 fall within the slots 49, 50 and 51. The pintle 41 has a tapered upper terminus; consequently, facilitating the rapid location of the work piece on the carrier 34. The attending operator then will exert a slight manual force on the top surface of the work piece 10 to depress the carrier 34 against the action of the supporting spring 44. The carrier 34 moves downwardly, and as a consequence, the deburring tool assemblies 22, 23 and 24 are moved downwardly so that the rollers 61, 71 and 72 engage the respective cams 63, 73 and 74 causing the pivotally mounted deburring tool assemblies to pivot against the action of springs 81, 82 and 83. The springs 81, 82 and 83 normally urge the respective deburring tool assemblies into a position where the deburring tools 29, 46 and 47 are held withdrawn from engagement with a work piece positioned on the carrier 34. As the carrier 34 moves downwardly, and all of the deburring tool assemblies pivot, the tools 29, 46 and 47 are moved outwardly into engagement with the edges of the apertures 14 formed in the respective depending lugs 11, 12 and 13 of the work piece 10.

Connected to the upper portion of each of the deburring tool assemblies is a burr-receiving tray 86. When the deburring tool assemblies are moved downwardly into deburring position, the trays 86 are moved into alignment with discharge chutes 87; consequently, any burrs that are cut from the work piece 10 merely drop into the trays 86 and out the chutes 87. This feature precludes any burrs from falling down into the moving portions of the machines to interfere with the normal operation.

If it is desired to change the relationship in which a deburring tool initiates a deburring operation, the adjusting screw 67 is turned, after releasing the holding screws 64 and 66, to adjust the position of the associated cam so that the associated deburring assembly is pivoted either prior to or subsequent to the initiation of the pivoting of the other deburring tool assemblies. If it is desired that all of the deburring tools accomplish a more complete deburring action, the screws 67 can be adjusted so that the associated cams are moved upwardly so that upon downward depression of the carrier 34, the respective deburring assemblies 22, 23 and 24 are pivoted to a greater degree; consequently, moving the deburring tools into deeper engagement with the depending lugs 11, 12 and 13 of the work piece 10.

It is to be understood that the above-described arrangements of apparatus and construction of elemental parts are simply illustrative of an application of the principles of the invention and many other modifications may be made without departing from the invention.

What is claimed is:

1. In a metal cutting machine, a housing, a carrier for holding a work piece slidably mounted in the housing, a plurality of tool holders pivotally mounted on the carrier for movement toward and away from the work piece on the carrier and having metal cutting tools rotatably mounted therein, means for continuously rotating said tools, resilient means for supporting said carrier in a predetermined position, means for urging said tool holders away from the work piece when the carrier is in the predetermined position, and means associated with each holder and mounted on the housing for moving said holders toward the work piece and against the effect of the urging means upon movement of the carrier out of the predetermined position and against the effect of the resilient means.

2. In a metal cutting machine, a housing, a carrier slidably mounted in the housing for holding a work piece, a plurality of tool assemblies pivotally mounted on said carrier for movement towards and away from a work piece, a constantly rotating cutting tool mounted in each tool assembly, means for urging each of said tool assemblies away from the work piece positioned on said carrier, a cam associated with each assembly and mounted on the housing in the path of movement of the carrier and assemblies, and means on each carrier engageable by the cams upon movement of the carrier for pivoting the tool assemblies against the effect of the urging means whereby the tools are moved into engagement with a work piece positioned on the carrier.

3. In a deburring machine, a hollow frame, a carrier mounted for sliding movement within the frame, a plurality of constantly rotating deburring tool assemblies mounted for pivotal movement on the carrier, a cam associated with each assembly and mounted on the inside of the frame for engaging and pivoting said tool assemblies, and resilient means for supporting the carrier in a position where the tool assemblies are spaced from the cams whereby depression of the carrier against the effect of the resilient means moves the tool assemblies into engagement with the cams.

4. In a deburring machine, a housing, a vertical shaft mounted within the housing, a carrier mounted for sliding movement on the housing, resilient means for supporting the carrier on the shaft, a plurality of deburring tools pivotally mounted on the carrier, means for urging and pivoting said tools into a predetermined position, and a cam means associated with each tool and mounted on the housing for engaging and pivoting the deburring tools against the effect of the urging means when the carrier is moved against the effect of the resilient support means.

5. In a metal cutting machine, a frame housing having a plurality of chutes mounted therein, a plurality of assemblies each having a rotatable metal cutting tool, a tray mounted on each assembly beneath the tool, a carrier, means for pivotally mounting each assembly on the carrier to move the tools into and out of cutting position and to move the trays into and out of engagement with an associated chute, means for resiliently supporting the carrier for movement to position the assemblies such that the tools are out of the cutting position and the trays are spaced from the chutes, and a cam means associated with each assembly and mounted on the frame housing for pivoting the assembly to move each tool into cutting position and each tray into engagement with a chute upon movement of the carrier against the force of the resilient means.

6. A deburring machine for a work piece having a circular flange, said flange having a plurality of circumferentially spaced apertures, which comprises a tubular housing, a carrier movably mounted within said housing for supporting a work piece, means for resiliently supporting said carrier, a plurality of deburring tools pivotally mounted on and spaced about the carrier, means for urging said tools from the apertures formed in the work piece mounted on the carrier, cam means associated with each tool and circumferentially spaced about and mounted on the inner wall of the housing, and cam followers mounted on said deburring tools for engaging said cams upon movement of the carrier against the resilient support to pivot the tools into the apertures formed in the work piece.

7. In a deburring tool a cylindrical housing having an inwardly turned flange on the upper end thereof, a shaft extending axially within said housing, a carrier slidably mounted on said shaft for supporting a work piece, resilient means for forcing the carrier upwardly against the flange, tool assemblies having rotatably mounted deburring tools thereon and pivotally mounted on said carrier for movement towards and away from a work piece placed on the carrier, a camming means associated with each assembly and mounted on the inner surface of the housing for engaging and moving each associated assembly towards the work piece upon placement of a work piece on the carrier and movement of the carrier downwardly against the force of the resilient means, and means for urging the assemblies into engagement with said camming means.

References Cited in the file of this patent

UNITED STATES PATENTS

| | | |
|---|---|---|
| 386,848 | Rast | July 31, 1888 |
| 2,115,439 | Wolfner | Apr. 26, 1938 |
| 2,174,803 | Mundt et al. | Oct. 3, 1939 |
| 2,304,930 | Klein | Dec. 15, 1942 |
| 2,734,402 | Hoern | Feb. 14, 1956 |